United States Patent
Zavada et al.

(10) Patent No.: US 10,099,403 B2
(45) Date of Patent: Oct. 16, 2018

(54) SOLUBLE MANUFACTURING AID

(71) Applicant: The Boeing Company, Chicago, IL (US)

(72) Inventors: Andrew M. Zavada, Mount Pleasant, SC (US); Brandon D. Booth, Mount Pleasant, SC (US); Isbelia D. Cardona, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 136 days.

(21) Appl. No.: 15/012,099

(22) Filed: Feb. 1, 2016

(65) Prior Publication Data

US 2017/0217053 A1    Aug. 3, 2017

(51) Int. Cl.
| | |
|---|---|
| *B29C 33/52* | (2006.01) |
| *B29C 39/02* | (2006.01) |
| *B29C 35/08* | (2006.01) |
| *B29C 33/38* | (2006.01) |
| *B29L 31/30* | (2006.01) |

(52) U.S. Cl.
CPC ............ *B29C 33/52* (2013.01); *B29C 33/38* (2013.01); *B29C 35/0805* (2013.01); *B29C 39/02* (2013.01); *B29C 2035/0827* (2013.01); *B29K 2805/00* (2013.01); *B29K 2995/0062* (2013.01); *B29L 2031/3076* (2013.01)

(58) Field of Classification Search
CPC ..... B29C 33/52; B29C 33/38; B29C 35/0805; B29C 39/02; B29C 2035/0827; B29C 45/4457; B29K 2805/00; B29K 2995/0062; B29K 45/4457; B29L 2031/3076

USPC .......................................................... 156/245
See application file for complete search history.

(56) References Cited

U.S. PATENT DOCUMENTS

| | | | | |
|---|---|---|---|---|
| 4,212,839 | A | * | 7/1980 | Funahashi ................ B41K 1/34 101/333 |
| 5,730,824 | A | | 3/1998 | Spence et al. |
| 5,964,979 | A | * | 10/1999 | George .................... B60R 13/04 156/295 |
| 6,375,880 | B1 | * | 4/2002 | Cooper .................... B29C 33/52 264/138 |
| 8,029,636 | B2 | | 10/2011 | Wycech |
| 2009/0025300 | A1 | * | 1/2009 | Ho ..................... B29C 45/14467 49/483.1 |
| 2015/0035200 | A1 | * | 2/2015 | Karpas ..................... B29C 33/52 264/255 |
| 2015/0239193 | A1 | | 8/2015 | Heath |

OTHER PUBLICATIONS

T.J. McCown G.E. Wahlmann. "Development of a Water Soluble Foam Packaging Material" (Jan. 1975).*

* cited by examiner

*Primary Examiner* — Matthew J Daniels
*Assistant Examiner* — Hana C Page
(74) *Attorney, Agent, or Firm* — MH2 Technology Law Group LLP

(57) ABSTRACT

Provided is a method of forming a shaped structure. The method includes coupling a first section of a mold to a second section of the mold such that a mold cavity is defined, wherein a cross-sectional shape of the mold cavity corresponds to a cross-sectional shape of the shaped structure and wherein at least one of the first section of the mold and the second section of the mold comprise a soluble material; at least partially filling the mold cavity with a curable polymer; and curing the curable polymer in the mold cavity to make the shaped structure.

18 Claims, 11 Drawing Sheets

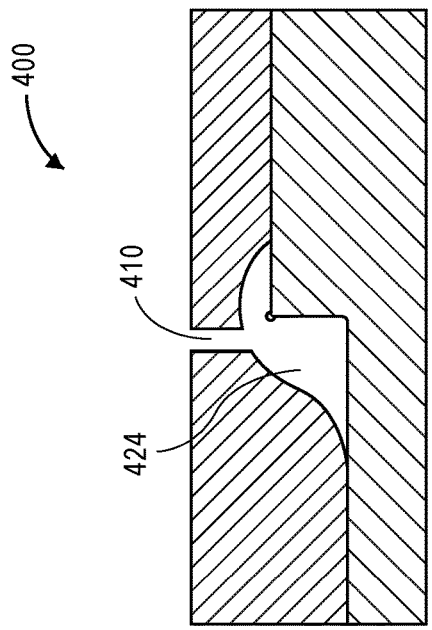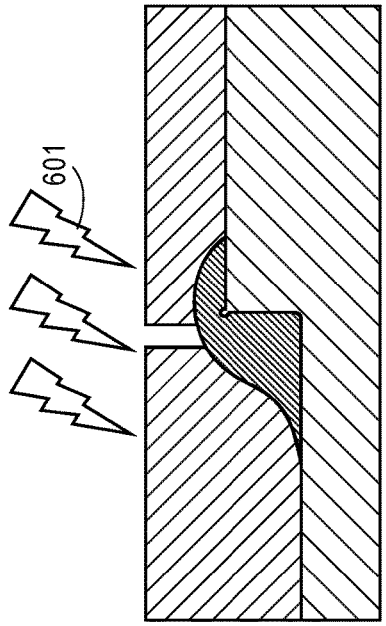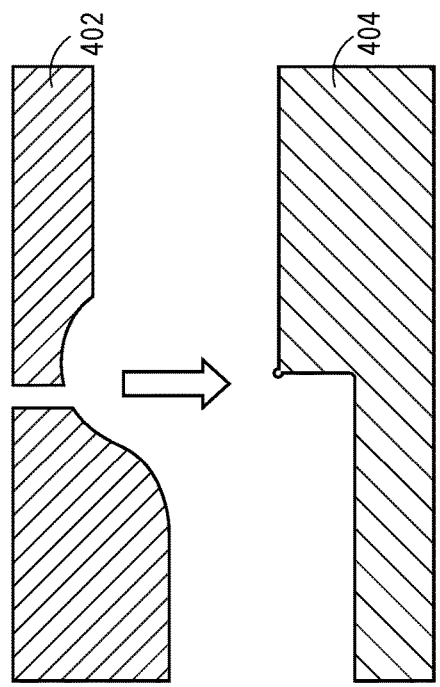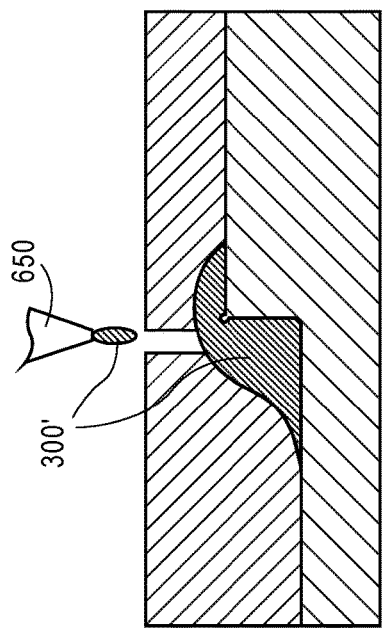

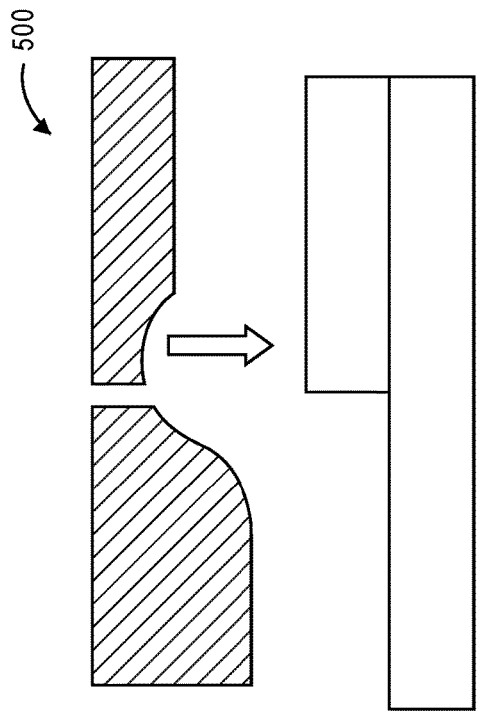
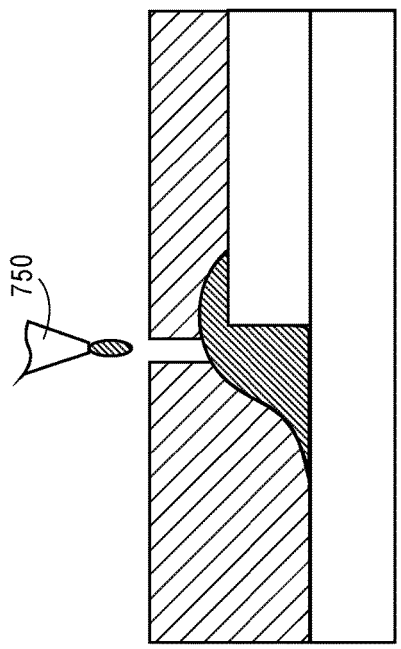
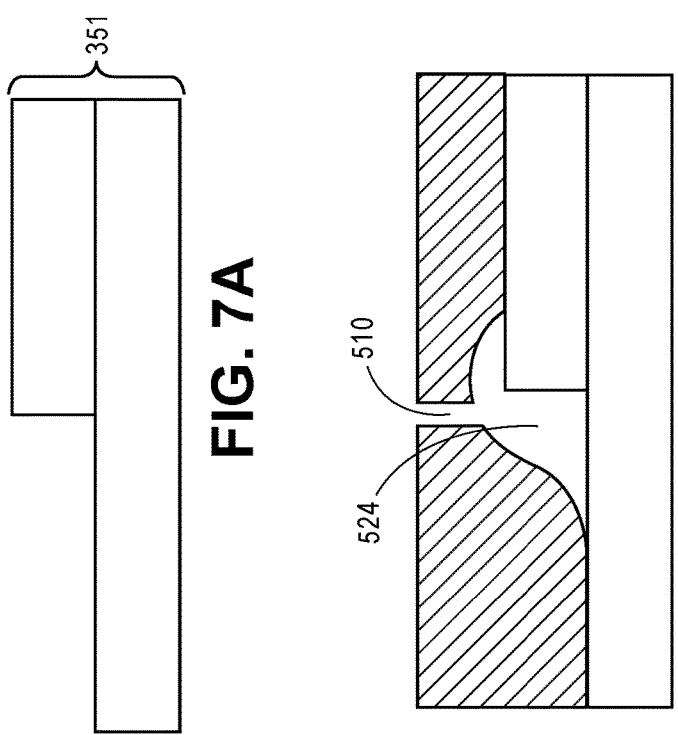
FIG. 7A
FIG. 7B
FIG. 7C
FIG. 7D

SOLUBLE MANUFACTURING AID

TECHNICAL FIELD

The subject matter described herein relates generally to the forming of articles and, more particularly, a method for forming elastomeric materials into desired shapes with the use of a soluble manufacturing aid.

BACKGROUND

In aircraft construction, the use of polymers with strong adhesion to substrates may be required for various reasons, including for forming and/or protecting components of the aircraft, such as the fuselage, wings, and others. Many structures, such as aircraft structures, include a plurality of assemblies that may create gaps, edges, ledges, and other discontinuities where elements of the assemblies interface. Efficient and safe operation of an aircraft, for example, requires that such discontinuities be sealed. Thus, polymers may be used for sealing surface discontinuities, such as encapsulating gaps, edges, ledges and other discontinuities on aircraft structures. When dispensing polymers onto a surface of a substrate, e.g., an aircraft part or aircraft assembly, it is often important to control one or more properties of the polymer, such as its profile or shape. Conventional manufacturing processes that require forming of polymers into complex geometries, are subject to a time-intensive process that include hand-working a high viscosity pre-polymer with the aid of volatile solvents. To increase viscosity, an existing solution is to use fillers within the uncured pre-polymer, which allows for applying the material manually onto the substrate. Yet even such high viscosity polymers require extensive manipulation by skilled mechanics/technicians and high viscosity materials may be difficult to clean, especially when working with substances having short cure times. Additionally, increasing of viscosity in order to allow for manipulation of the polymer into complex shapes results in lower adhesion of such polymers onto the substrates. What is needed in the art, therefore, is a method of forming curable polymers into complex shapes that allows for the use of lower viscosity curable polymers.

SUMMARY

In an example, there is a method of forming a shaped structure, comprising: coupling a first section of a mold to a second section of the mold such that a mold cavity is defined, wherein a cross-sectional shape of the mold cavity corresponds to a cross-sectional shape of the shaped structure and wherein at least one of the first section of the mold and the second section of the mold comprise a soluble material; at least partially filling the mold cavity with a curable polymer; and curing the curable polymer in the mold cavity to make the shaped structure.

In another example, there is a method of forming a shaped structure, comprising: coupling a mold comprising a body portion having a cavity surface to a substrate such that a mold cavity is defined between the cavity surface and the substrate, wherein a cross-sectional shape of the cavity corresponds to a cross-sectional shape of the shaped structure, wherein the body portion comprising a soluble material; depositing a curable polymer into the cavity through an opening in the mold; and curing the curable polymer to form a cured polymer.

In another example, there is an article, comprising a curable polymer formed as a shaped structure. The curable polymer does not comprise a viscosity-increasing filler. The shaped structure is formed by at least partially filling a mold cavity with the curable polymer and curing the curable polymer. The mold comprises a soluble material.

The methods and articles described herein allow for the rapid formation of cured polymers in complex geometries where chemicals that negatively affect polymer adhesion to substrates or chemicals that create unsafe work environments cannot be used.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this specification, illustrate examples of the present teachings and together with the description, serve to explain the principles of the disclosure.

FIGS. 6A-6H illustrate various steps in a method of forming a shaped polymer using the mold of FIG. 4A.

FIGS. 7A-7G illustrate various steps in a method forming a shaped polymer using the mold of FIG. 5A.

DESCRIPTION OF THE EXAMPLES

Figure 1A:
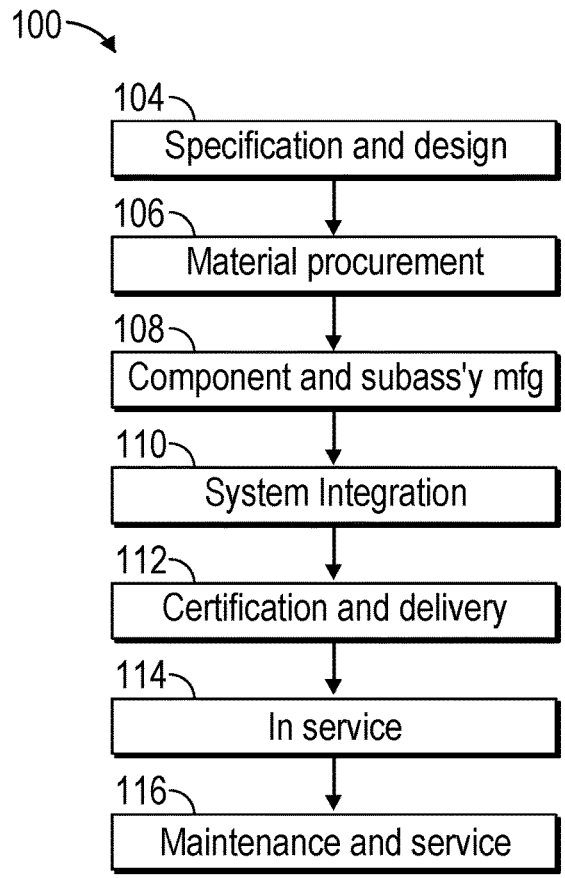
FIG. 1A is a flow diagram of aircraft production and service methodology, according to an example.

Reference will now be made in detail to the examples which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples can be combined with one or more other examples to form new examples. It will be understood that the structures depicted in the figures may include additional features not depicted for simplicity, while depicted structures may be removed or modified.

Disclosed herein is a method for forming a shaped structure comprising a cured polymer that benefits from the use of a soluble manufacturing aid in which a curable polymer can be shaped and cured, such as in a mold comprising a soluble material, for forming curable polymers into complex shapes. The methods and apparatus described herein also provide for forming shaped structures comprising a curable polymer that may be utilized for sealing gaps, edges, ledges, and other discontinuities in a surface of a structure, such as an aircraft. The methods and apparatus provide a cured polymer structure in a desired pre-determined cross-sectional shape, such as a shape that fits a fillet defined on the surface of a substrate. The cured polymer structure may be formed in a soluble mold to thereby reduce or eliminates a need for rework after the polymer is applied to the structure. In addition, other work on the structure does not need to be delayed to allow uncured polymer to cure in place. Accordingly, the methods facilitate avoiding the use of high-viscosity polymers, such as those polymers having viscosities of 1000-16,000 Poise, including Class B, Class C, or Extrusion Grade Sealants and those to which fillers are added to attain such viscosities, thereby enabling the use of curable polymers that otherwise are unable to maintain their own shape due to their lower viscosities, such as those having viscosities of 150-500 Poise, including Class A or Brush Grade Sealant. Class A, B, C, Extrusion Grade Sealants, and Brush Grade Sealants are available from Bergdahl Associates, Inc. of Reno, Nev.

In an example, a mold, such as a foam mold comprising a soluble material, may be used for forming the cured polymer structure. In an example, the mold comprises a body portion, such as a first section and a second section, and a cavity portion wherein the body portion is formed of a starch-based foam and the cavity portion defines a complex shape in which a curable polymer is desired to be formed into a shaped structure upon curing. Accordingly, the mold allows for the containment of curable pre-polymers, such as those having viscosities of 150 to 500 Poise, including Class A or Brush Grade sealant, in a volume having a complex shape without compromising polymer adhesion to substrates or without compromising other physical properties of the polymer material. The method further includes curing the polymer within the sacrificial mold and then removing the sacrificial mold. The polymer may be partially or fully cured. For example, the polymer may be cured until it is tack free. The sacrificial mold may be removed, for example, after the polymer has been cured for a tack free time, by soaking it with a liquid, such as a solvent, including water or an appropriate non-hazardous solution. Thus, for some of the methods described herein, a fully environmentally desirable process that does not require additional special handling or equipment may be provided. By soaking the sacrificial mold with the liquid, it breaks down such as via dissolving in the liquid. Optionally, light mechanical abrasion to assist in dissolving and removing the sacrificial mold may be utilized, for example, manual destruction of the foam structure and/or using a wet cloth to both dissolve and break-apart the mold. Optionally, the methods disclosed herein may be executed without the use of volatile solvents. The methods described herein may provide for faster processing of the pre-polymer, better polymer adhesion to substrates via the use of lower viscosity pre-polymers (as compared to higher viscosity polymers that contain viscosity-increasing fillers in order to allow for manual manipulation of the polymer into complex shapes), and the elimination of volatile solvents as used in the conventional methods for forming/shaping such polymers. For the purpose of this disclosure, the term, "sacrificial" refers to material that may be consumed, in part or in whole, during a manufacturing operation.

Figure 1B:
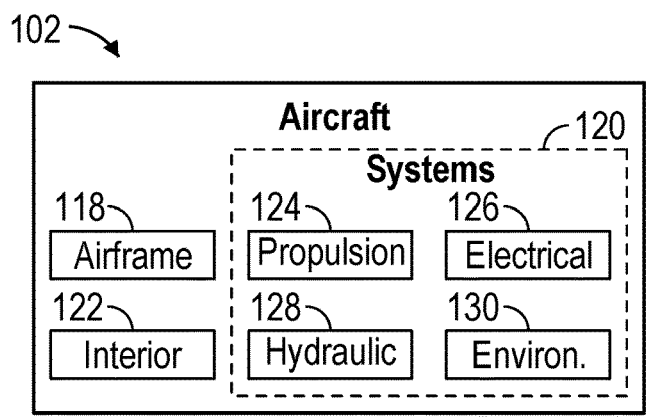
FIG. 1B is a block diagram of an aircraft, according to an example.

Referring more particularly to the drawings, examples of the disclosure may be described in the context of an aircraft manufacturing and service method 100 as shown in FIG. 1A and an aircraft 102 as shown in FIG. 1B. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 may be scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 1B, the aircraft 102 produced by exemplary method 100 may include an airframe 118 with a plurality of systems 120 and an interior 122. Examples of high-level ones of systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive or marine industries.

Figure 2:
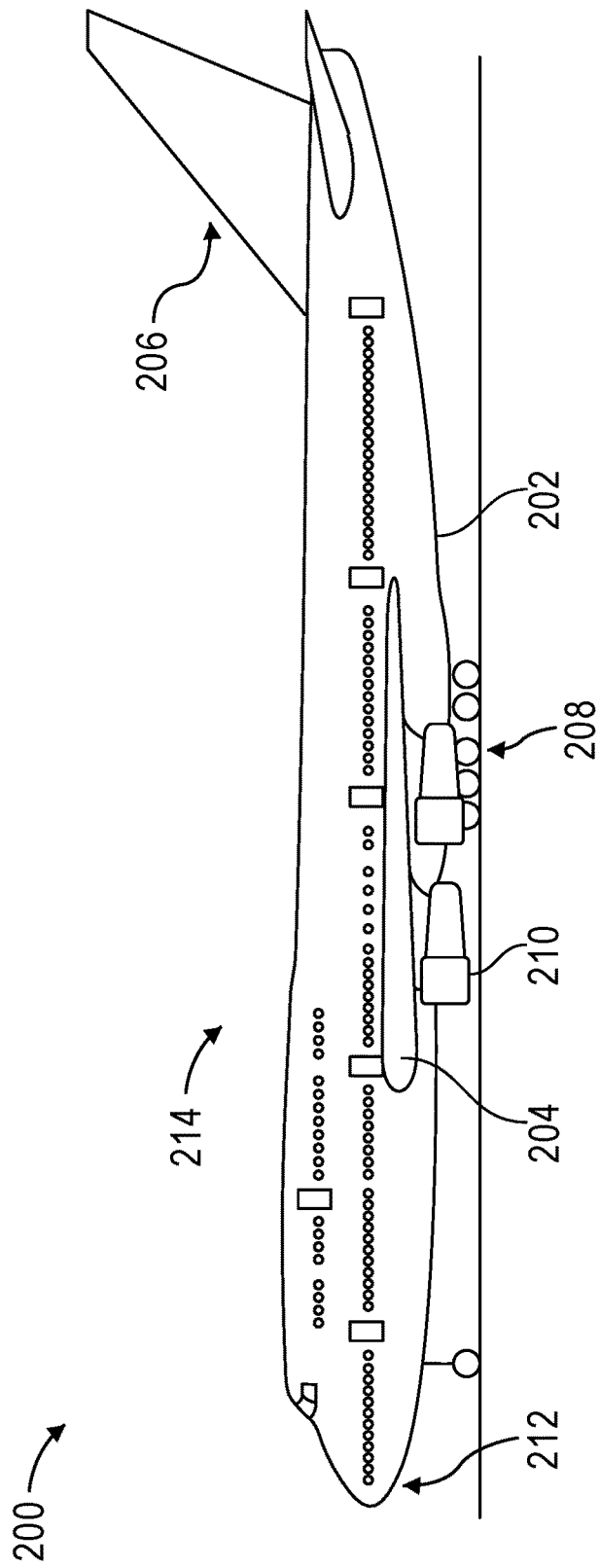
FIG. 2 is a schematic illustration of an aircraft, according to an example.

FIG. 2 is a side elevation view of an aircraft 200 having one or more parts which may be joined together and or require use of elastomeric materials, for example, used as a sealant to protect materials thereof. One of ordinary skill in the art will appreciate that such elastomeric materials may be employed, for example, formed in complex shapes and cured, during the manufacturing a wide variety of parts that may be incorporated at various locations, including the fuselage, wings, empennage, body, and walls of the aircraft 200. In alternate examples, elastomeric materials may be used in methods for forming parts for other types of structures, vehicles, and platforms, such as motor vehicles, aircraft, maritime vessels, or spacecraft, or other suitable applications. Methods for forming elastomeric materials into shaped structures using a mold comprising a soluble material, as described below, provide for a decrease in manufacturing or repair times of complex assemblies, such as aircraft 200. For example, in conventional methods, manufacturing times are increased due to the requirement that elastomers must be sufficiently cured for a first period of time (i.e., until tack-free time is reached) and are manually manipulated (shaped) into the final desired geometry. In contrast, via the methods described herein, elastomers/curable polymers immediately attain a desired geometry in a mold, thereby eliminating the time required for manual manipulation/shaping and may not require complete curing in order to maintain the desired geometry, even upon removal of the mold.

In this example, the aircraft 200 includes a fuselage 202 including wing assemblies 204, a tail assembly 206, and a landing assembly 208. The aircraft 200 further includes one or more propulsion units 210, a control system 212 (not visible), and a host of other systems and subsystems that enable proper operation of the aircraft 200. An elastomeric material formed in accordance with an exemplary method of the disclosure may be employed in manufacturing any suitable portion of the aircraft 200, such as in wing assemblies 204, tail assembly 206, and any other suitable areas of the aircraft 200. In general, the various components and subsystems of the aircraft 200 may be of known construction and, for the sake of brevity, will not be described in detail herein.

Although the aircraft 200 shown in FIG. 2 is generally representative of a commercial passenger aircraft, including, for example, the 737, 747, 757, 767, 777, and 787 models commercially available from The Boeing Company of Chicago, Ill., the inventive methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, spacecraft and any other types of manned or unmanned air vehicle.

Figure 3:
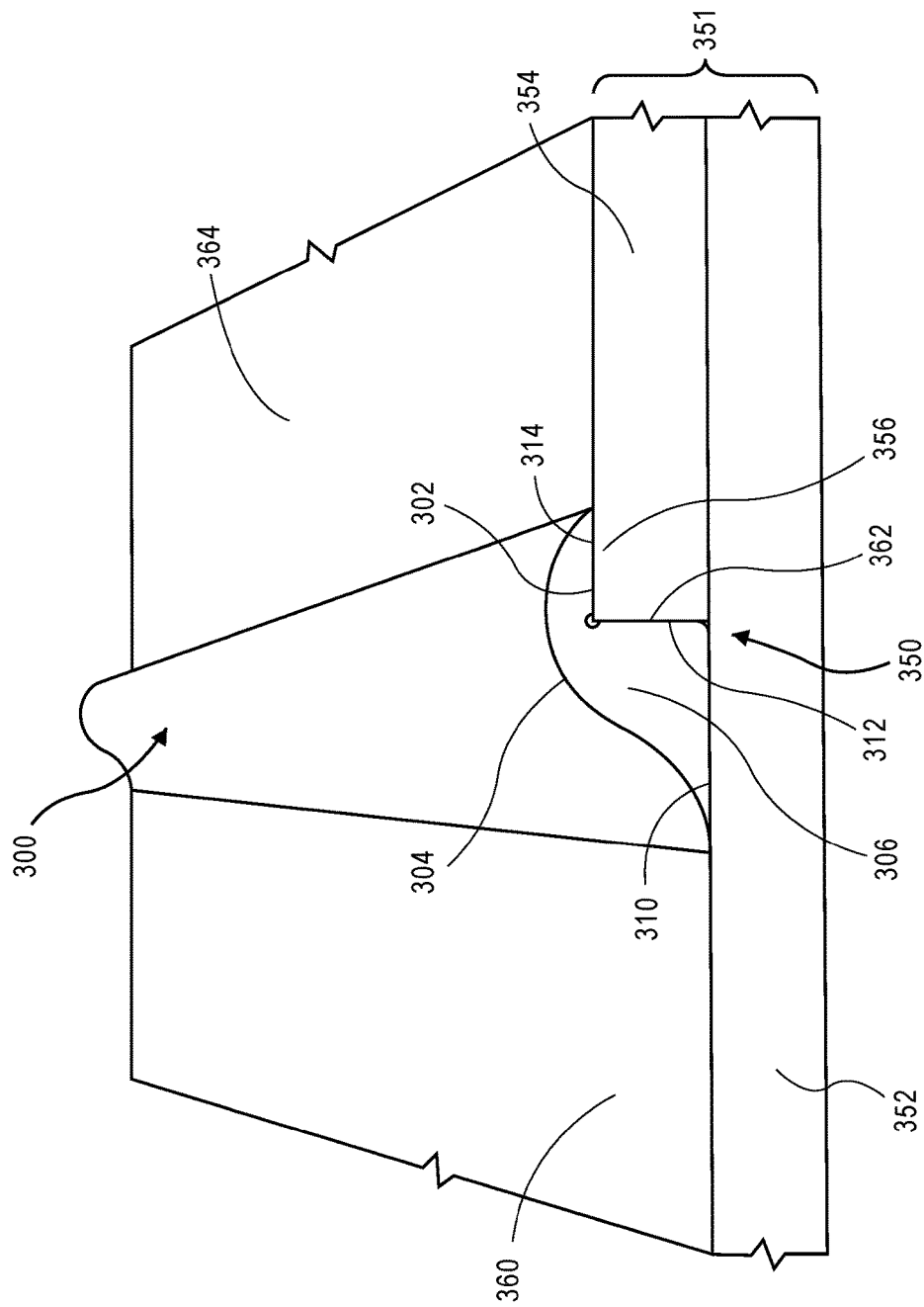
FIG. 3 is a schematic diagram of an example of a cured polymer structure applied to an example structural discontinuity.

As illustrated schematically in FIG. 3, an exemplary shaped structure 300, which may comprise a cured polymer, such as an elastomeric material, is formed on a substrate 351 such as at a discontinuity 350. Depending on its location on substrate 351, shaped structure 300 may have a complex shape which may be difficult to form using conventional methods such as by hand-forming using a highly viscous polymer and solvents, but may be attained via the use of a mold as described in the examples herein. For example, as shown in FIG. 3, shaped structure 300 includes a contact surface 302 configured to be at least partially complementary to discontinuity surface 356 of the substrate 351. The shaped structure 300 may adhere to substrate 351. The shaped structure 300 may facilitate a seal against fluid flow between first structural member 352 and second structural member 354 when shaped structure 300 is applied to discontinuity 350. In the example shown in FIG. 3, contact surface 302 is defined by a first segment 310 configured to fit against outer surface 360 of first structural member 352 of substrate 351, a second segment 312 configured to fit against edge surface 362 of second structural member 354 of substrate 351, and a third segment 314 configured to fit against outer surface 364 of second structural member 354. Shaped structure 300 may also include a non-contact surface 304 and a cross-sectional shape 306 defined between contact surface 302 and non-contact surface 304. In the above-example, cross-sectional shape 306 is selected to satisfy at least one criterion with respect to shaped structure 300. The at least one criterion may be, for example, a minimum thickness for shaped structure 300 at discontinuity 350. The minimum thickness may be defined based on, for example, a minimum length of first segment 310, a minimum length of third segment 314, or any other suitable measure.

Figure 4A:
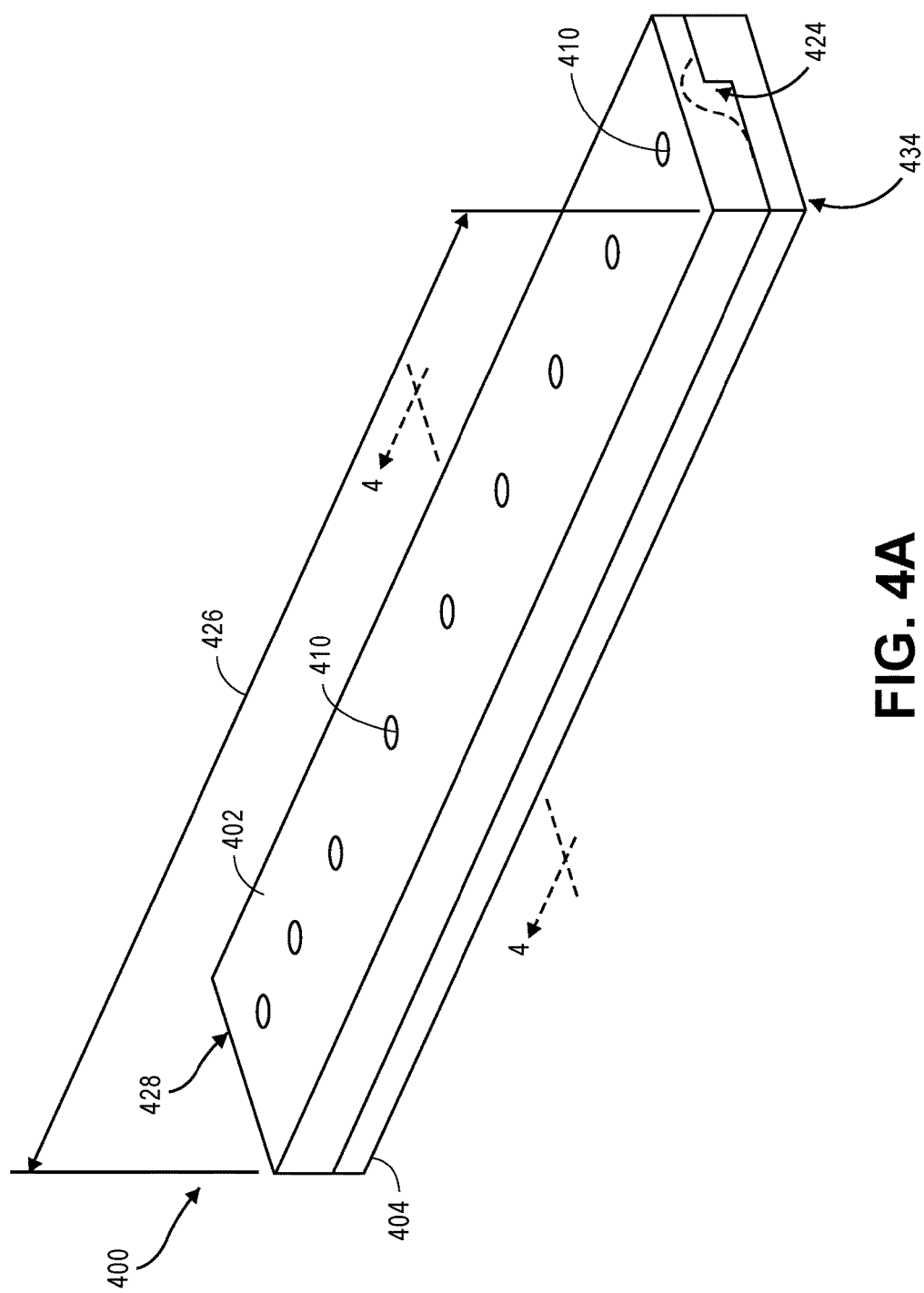
FIG. 4A is a schematic diagram of an example of a mold configured for making the preformed seal shown in FIG. 3.
Figure 4B:
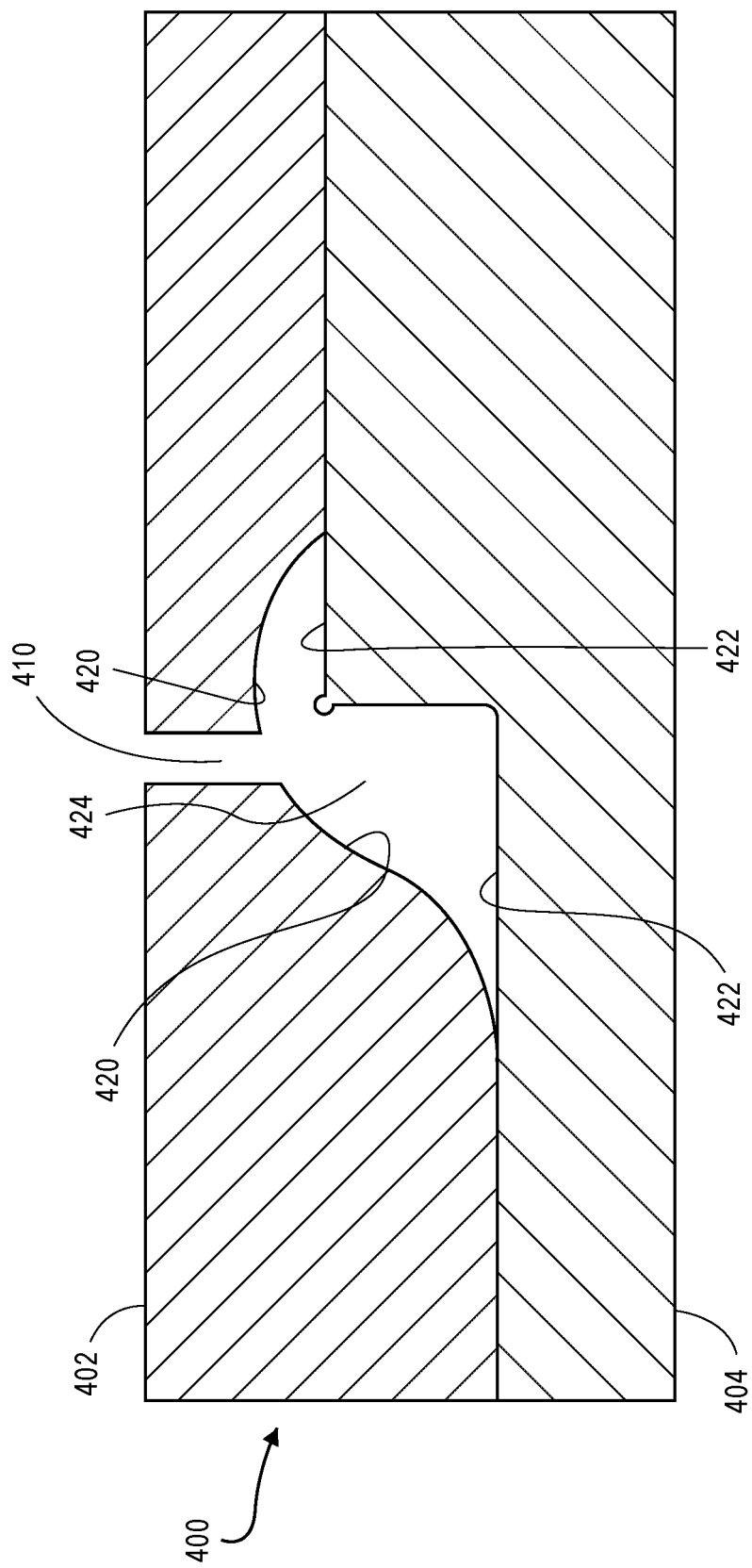
FIG. 4B is a cross-sectional view of the mold shown in FIG. 4A.
Figure 5A:
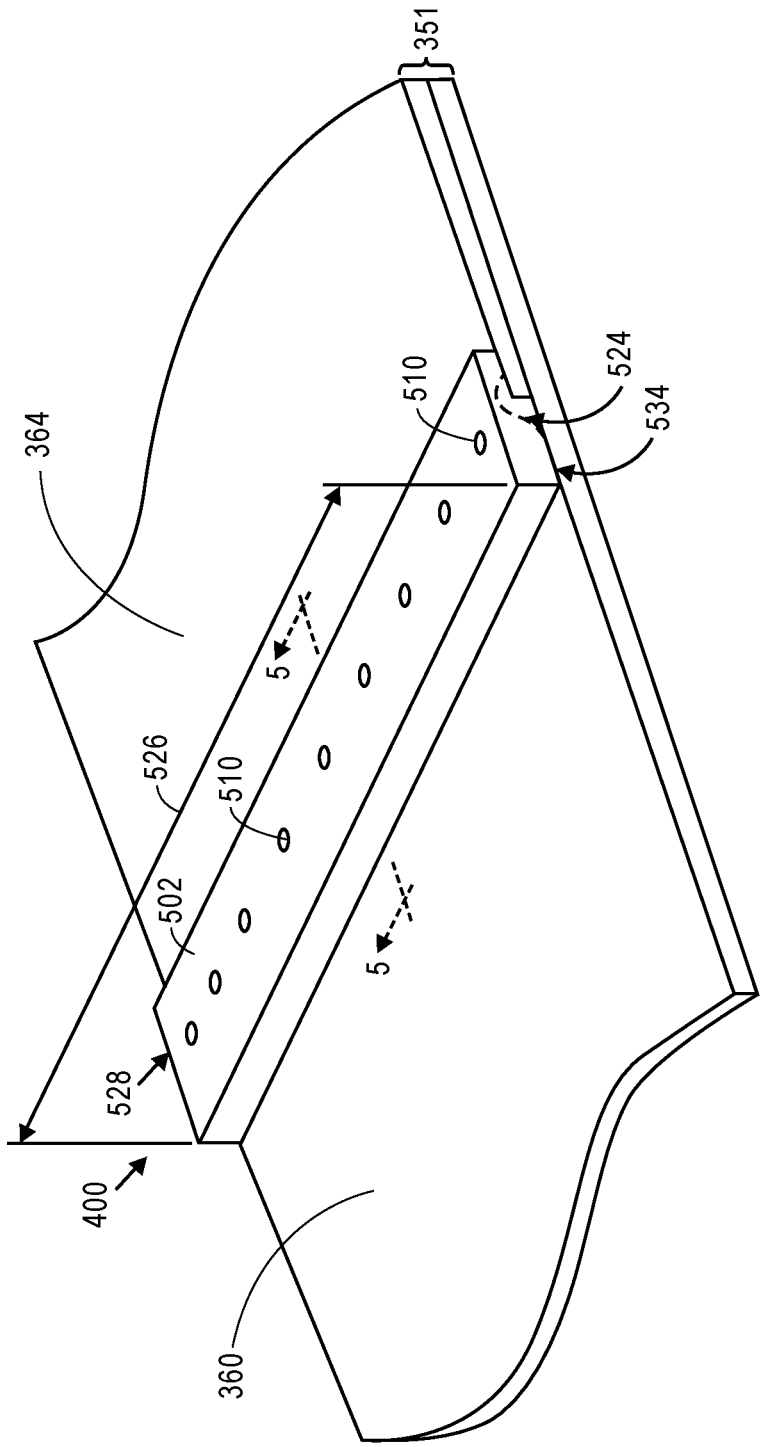
FIG. 5A is a schematic diagram of an example of a mold configured for making the preformed seal shown in FIG. 3.
Figure 5B:
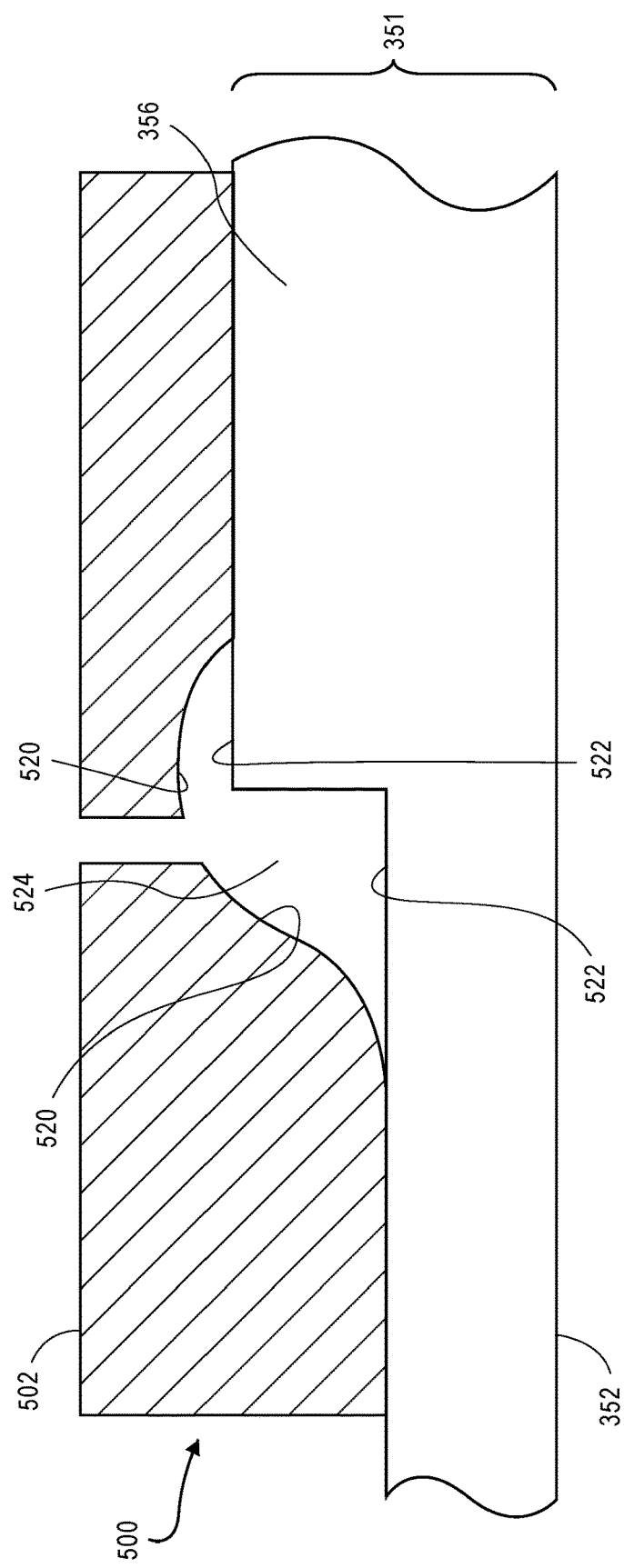
FIG. 5B is a cross-sectional view of the mold shown in FIG. 5A.
Figure 6E:
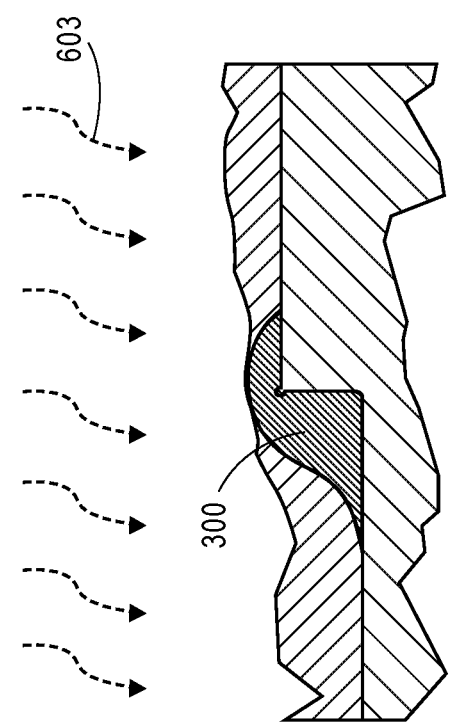
Figure 6F:
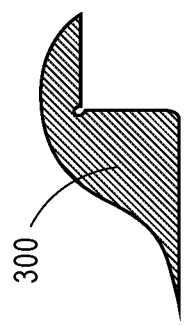
Figure 6G:
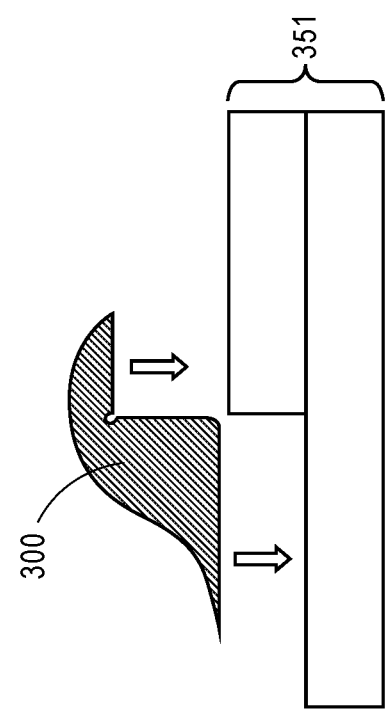
Figure 6H:
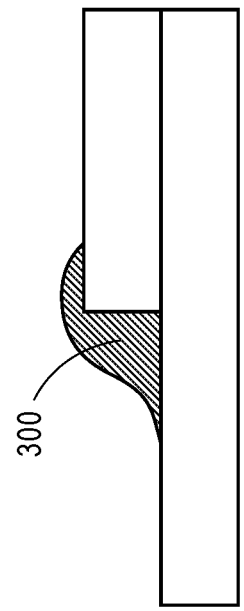

In an example, shaped structure 300 is preformed, for example, in a mold 400 such as shown in FIGS. 4A-4B and according to a method illustrated in FIGS. 6A-6F and may subsequently be attached to a substrate as shown in FIGS. 6G-6H and as described below. In an example, shaped structure 300 is formed directly on substrate 351 using a barrier mold 500 such as shown in FIGS. 5A-5B and according to a method illustrated in FIGS. 7A-7G and as described below. As further described below, mold 400 and barrier mold 500 may be formed of a soluble material, for example, a starch-based material, and may be removed after forming the shaped structure 300, for example, by dissolving the mold with a solvent such as water and/or organic solvent and/or with mechanical force. Because such molds may be in provided in the form of a foam, such as a starch-based foam, an improved method for forming shaped structures described herein may comprise at least one uncured polymer. Soluble materials such as starch-based materials, including those made from amylose and amylopectin, may be used for forming mold 400 and barrier mold 500. For example, mold 400 and barrier mold 500 may be formed of GREENCELLFOAM™ available from KTM Industries, Inc. (Lansing, Mich.). In an example, mold 400 and barrier mold 500 may be formed from formed from laminated layers of biodegradable structured foam packing comprising a starch component, wherein the starch component comprises unmodified and modified corn, potato, wheat, rice, tapioca, waxy maize, high amylase corn starch, or combinations thereof.

An exemplary mold 400 for making, for example, performing, a shaped structure 300 is illustrated schematically in a perspective view in FIG. 4A. A cross-section of exemplary mold 400 taken along line 4-4 is illustrated schematically in FIG. 4B. With reference to FIGS. 4A-4B, mold 400 includes a first section 402 and a second section 404. First section 402 and second section 404 each include at least one access conduits 410. Access conduits 410 may extend through at least first section 401 and may be configured to enable transport of flowable material, such as an uncured polymer, into a cavity portion 424 of the mold 400. The access conduit 410 may be plugged such that flowable material in the cavity portion 424 cannot flow out of the mold 400. Additionally, first section 402 and second section 404 may be removably coupled together in any appropriate manner (not shown), for example via clamping together with a removable clamp, fastening together with a removable fastener, or compressing together with removable bolts that extend through the first and second sections. First section 402 and second section 404 may each include additional access conduits that further provide for the transporting of flowable material, such as uncured polymer, into the cavity portion 424 of the mold. Similarly, all access conduits may be closed, such as plugged closed, in order to prevent any flowable material in the cavity from existing the mold.

First section 402 includes a first molding surface 420, and second section 404 includes a second molding surface 422. First molding surface 420 is configured to be complementary to a first portion of the surface of shaped structure 300, and second molding surface 422 is configured to be complementary to a second portion of the surface of shaped structure 300. In particular, first molding surface 420 is complementary to non-contact surface 304, and second molding surface 422 is complementary to contact surface 302. When first section 402 and second section 404 are coupled together, a mold cavity portion 424 is defined between first molding surface 420 and second molding surface 422 such that a cross-sectional shape of mold cavity portion 424 corresponds to cross-sectional shape 306 of shaped structure 300. Mold cavity portion 424 may extend through first end 434 of first section 402 and second section 404, along a length 426 of first section 402 and second section 404, and through a second end 428 opposite first end 434.

Mold 400 may be formed of a soluble material which may be removed after forming the shaped structure 300 therein, such as after curing a curable polymer which is formed in a cavity portion between first section 402 and second section 404. For example, first section 402 and second section 404 may be formed of a starch-based material. Thus, first section 402 and second section 404 may be removed, after forming shaped structure 300 therein, by dissolving with a solvent, such as water and/or an organic solvent. Therefore, it is undesirable to expose the mold 400 to a solvent (i.e., wetting) before curing the curable polymer because doing so may compromise the integrity of the material from which the mold is formed such that it is not useful as a mold. First section 402 and second section 404 may be broken apart using mechanical force instead of or in addition to a dissolving step. In an example, portions of first section 402 and/or second section 404 are first removed by dissolving away with a solvent and then remaining portions of first section 402 and or second section 404 may be removed by mechanical force.

As described above, a shaped structure 300 may also be formed directly on a substrate 351 using a barrier mold 500. An exemplary barrier mold 500 for making a shaped structure 300 directly on a substrate 351 is illustrated schematically in a perspective view in FIG. 5A. Accordingly, the arrangement shown in FIG. 5A may be viewed as functioning similar to that in FIG. 5B, except that the substrate 351 in FIG. 5A functions as a second mold section similar to the second section 404 of mold 400. A cross-section of exemplary barrier mold 500 taken along line 5-5 is illustrated schematically in FIG. 5B. With reference to FIGS. 5A-5B, barrier mold 500 includes a body portion 502 and molding surface 520. Access conduits 510 may extend through body portion 502 and may be configured to enable transport of flowable material, such as an uncured polymer, into a cavity 524 that is formed when barrier mold 500 is removably placed on and/or coupled to substrate 351. Alternatively, access conduit(s) may be formed as a space between the barrier mold and the substrate. The access conduit 510 may be plugged such that flowable material in the cavity 524 cannot flow out. Additionally, body portion 502 and substrate 351 may be removably coupled together in any appropriate manner (not shown), for example via clamping together with a removable clamp, fastening together with a removable fastener, or compressing together with removable bolts that extend through the first and second sections. Body portion 502 and substrate 351 may each include additional access conduits that further provide for the transporting of flowable material, such as the uncured polymer, into the cavity 524 formed between barrier mold 500 and substrate 351.

Body portion 502 includes a first molding surface 520, and substrate 351 includes a second molding surface 522. First molding surface 520 is configured to be complementary to a first portion of the surface of shaped structure 300, and second molding surface 522 is configured to be complementary to a second portion of the surface of shaped structure 300. In particular, first molding surface 520 is complementary to non-contact surface 304, and second molding surface 522 is complementary to contact surface 302. When body portion 502 and substrate 351 are coupled together, a mold cavity 524 is defined between first molding surface 520 and second molding surface 522 such that a cross-sectional shape of mold cavity 524 corresponds to cross-sectional shape 306 of shaped structure 300. Cavity 524 may extend through first end 534 of body portion 502 along a length 526 of body portion 502 and substrate 351, and through a second end 528 opposite first end 534.

Barrier mold 500 may be formed of a soluble material which may be removed after forming the shaped structure 300 therein, such as after curing a curable polymer which is formed in a cavity portion between body portion 502. For example, body portion 502 may be formed of a starch-based material. Thus, body portion 502 may be removed after forming the shaped structure 300 therein by dissolving with a solvent, such as water and/or an organic solvent. Therefore, it is undesirable to expose the mold 500 to a solvent (i.e., wetting) before curing the curable polymer because doing so may compromise the integrity of the material from which the mold is formed such that it is not useful as a mold. Body portion 502 may be broken apart using mechanical force instead of or in addition to a dissolving step. In an example, portions of body portion 502 are first removed by dissolving away with a solvent and then remaining portions of body portion 502 may be removed by mechanical force.

In an example, to form shaped structure 300 using mold 400, first section 402 and second section 404 are coupled together as indicated by FIGS. 6A-6B. A flowable material 300' comprising, for example, uncured curable polymer may be introduced into cavity portion 424 through access conduit 410 via nozzle 650 to at least partially fill the cavity as shown in FIG. 6C. The flowable material may be heated to a predetermined temperature. The predetermined temperature may be selected in a range that facilitates smooth flow of uncured curable polymer into the cavity portion 424, yet does not induce heat-related cross-linking of the uncured curable polymer. The flowable material 300' may then be transformed into a shaped structure. For example, in the case of a flowable material 300' that comprises a curably polymer, the flowable material 300' may be exposed to an energy source 601 that causes the curable polymer to cure (i.e., crosslink) as shown in FIG. 6D. The energy source 601 may be a heat source that heats the flowable material 300' to its curing temperature. In an example, the energy source 601 may be an electromagnetic energy source, such as light, to which the mold is transparent and can initiate cross-linking of the flowable material 300'. After the flowable material is sufficiently solidified, such as sufficiently cured, the mold 400 may be removed. For example, at least some portions of mold 400 may be exposed to a solvent 603 and dissolved away as shown in FIG. 6E, leaving behind a shaped structure 300 comprising a cured polymer as in FIG. 6F. Advantageously, mold 400 may be used to form a shaped structure 300 that requires less material, is less time consuming, is safer and may utilize curable polymers of lower viscosity relative to a typical application of uncured polymer onto substrate 351 such as those that require fillers in order to increase the viscosity thereof. Accordingly, the curable polymers used in the examples described herein may not comprise viscosity-increasing fillers. Additionally, because the molds described herein may be shaped to meet manufacturing tolerances, a preformed shaped (molded) structure 300 as formed in FIGS. 6A-6F may be attached to a substrate 351 as shown in FIGS. 6G-6H to function as a seal, for example.

Figure 7F:
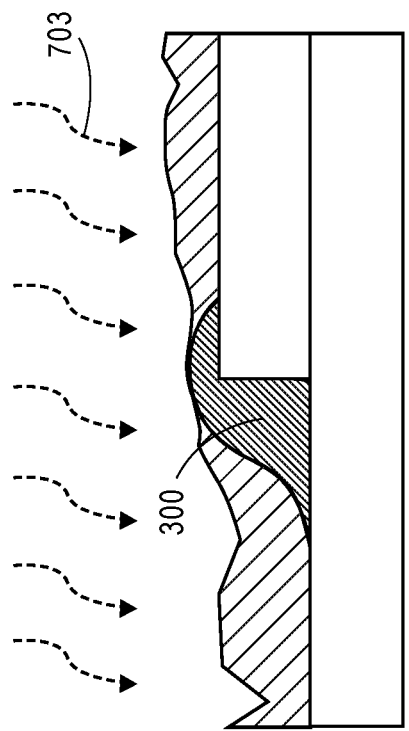
Figure 7E:
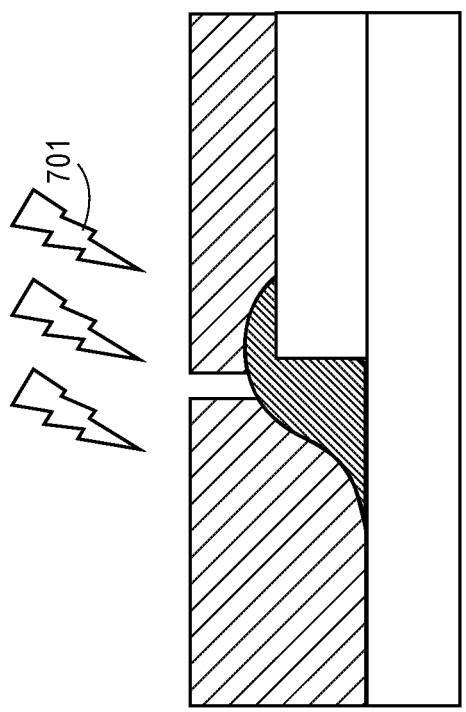
Figure 7G:
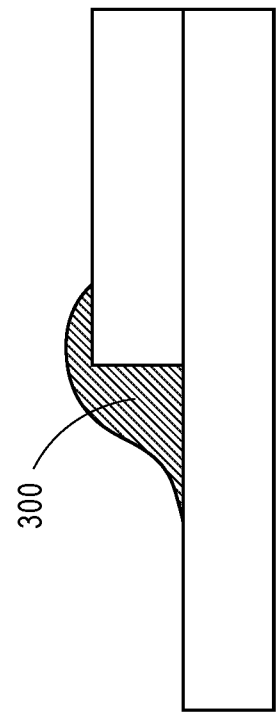

In an example, to form shaped structure 300 using barrier mold 500, body portion 502 is coupled to substrate 351 as indicated by FIGS. 7A-7C. A flowable material 300' comprising, for example, uncured curable polymer may be introduced into cavity 524 through access conduit 510 via nozzle 750 to at least partially fill the cavity as shown in FIG. 7D. In an example, the flowable material may be heated to a predetermined temperature. The predetermined temperature may be selected in a range that facilitates smooth flow of uncured curable polymer into the cavity 524, yet does not induce heat-related cross-linking of the uncured polymer. The flowable material 300' may then be transformed into a shaped structure. For example, in the case of a flowable material 300' that comprises a curably polymer, the flowable material 300' may be exposed to an energy source 701 that causes the curable polymer to cure (i.e., crosslink) as shown in FIG. 7E. In an example, the energy source 701 may be a heat source that heats the flowable material 300' to its curing temperature. In an example, the energy source 701 may be an electromagnetic energy source, such as light, to which the mold is transparent and can initiate cross-linking of the flowable material 300'. After the flowable material is sufficiently solidified, such as sufficiently cured, the barrier mold 500 may be removed. For example, at least some portions of mold 500 may be exposed to a solvent 703 and dissolved away as shown in FIG. 7F, leaving behind a shaped structure 300 comprising a cured polymer as in FIG. 6F. Advantageously, barrier mold 500 may be used to form a shaped structure 300 that requires less material, is less time consuming, is safer and may utilize curable polymers of lower viscosity relative to a typical application of uncured polymer onto substrate 351 such as those that require fillers in order to increase the viscosity thereof. Accordingly, the curable polymers used in the examples described herein may not comprise fillers. Additionally, because the molds described herein may be shaped to meet manufacturing tolerances, a shaped (molded) structure 300 as formed in FIGS. 7A-7F may be formed directly on a substrate 351 as shown in FIG. 7G to function as a seal, for example.

The flowable materials described herein may comprise curable polymer. The polymer may be selected from any polymer that can be cured with or without the need to apply external stimulus to induce curing of the polymer. The polymer may be selected from any polymer that can be cured at a temperature that does not degrade the mold, such as a mold comprising a soluble material, in which the polymer is being cured into a shaped structure as described herein, for example, to a degree that renders the mold structurally unusable for sufficiently supporting the curable polymer. An external stimulus, such as exposure to UV-radiation, may be applied to a curing agent mixed with the curable polymer in order to activate the curing agent which in turn initiates cross-linking/curing of the curable polymer. When cured as a shaped structure, such polymers may be used as a sealant over discontinuities, as well as over bolt heads and other fasteners but the cured polymers are not so limited. Elastomeric materials such as polysulfides, polythioethers, polysiloxanes and polyurethanes may be utilized. For example, PR 1776M Class B-2 available from PPG Aerospace may be used.

While the examples have been illustrated respect to one or more implementations, alterations and/or modifications can be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A method of forming a shaped structure, comprising:
coupling a first section of a mold to a second section of the mold such that a mold cavity is defined,
wherein a cross-sectional shape of the mold cavity corresponds to a cross-sectional shape of the shaped structure, and
wherein the first section of the mold and the second section of the mold comprise a soluble material;
at least partially filling the mold cavity with an uncured curable polymer;
curing the uncured curable polymer in the mold cavity to make the shaped structures;
removing the first section and the second section of the mold to expose the shaped structure,
wherein removing of the first section and second section of the mold comprises dissolving the soluble material with a solvent; and
attaching the shaped structure to a substrate comprising a discontinuity, wherein the shaped structure functions as a seal at the discontinuity.

2. The method of claim 1, wherein the solvent comprises water.

3. The method of claim 1, wherein the solvent comprises an organic solvent.

4. The method of claim 1, wherein the soluble material comprises a starch.

5. The method of claim 1, wherein the soluble material comprises a foam.

6. The method of claim 1, wherein the soluble material comprises a starch component selected from unmodified and modified corn, potato, wheat, rice, tapioca, waxy maize, high amylase corn starch, or combinations thereof.

7. The method of claim 1, wherein the substrate comprises wherein the substrate comprises a first structural member having an outer surface, a second structural member having an outer surface and an edge surface, and the discontinuity is defined between the first structural member and the second structural member.

8. The method of claim 1, wherein at least one of the first continuous section of the mold and the second continuous section of the mold comprises a plurality of access conduits, and wherein the at least partially filling of the mold cavity with the curable polymer comprises introducing the curable polymer into the cavity through at least one of the plurality of access conduits.

9. The method of claim 8, wherein the method further comprises plugging closed at least one of the plurality of access conduits to prevent the uncured curable polymer from flowing out of the cavity.

10. A method of forming a shaped structure, comprising:
coupling a mold comprising a body portion and a cavity surface to a substrate such that a mold cavity is defined between the cavity surface and the substrate,
wherein the substrate comprises a first structural member having an outer surface, a second structural member having an outer surface and an edge surface, and a discontinuity between the first structural member and the second structural member,
wherein a cross-sectional shape of the cavity corresponds to a cross-sectional shape of the shaped structure, and
wherein the body portion comprises a soluble material;
depositing a curable polymer into the cavity through at least one opening in the mold and onto the discontinuity;
curing the curable polymer to form a cured polymer, wherein at least a portion of the curable polymer contacts the outer surface of the first structural member and the outer surface of the second structural member; and
removing at least some of the body portion of the mold to expose the cured polymer,
wherein the removing of at least some of the body portion of the mold comprises dissolving the soluble material with a solvent.

11. The method of claim 10, wherein the solvent comprises water.

12. The method of claim 10, wherein the solvent comprises an organic solvent.

13. The method of claim 10, wherein the soluble material comprises a starch.

14. The method of claim 10, wherein the soluble material comprises a foam.

15. The method of claim 10, wherein the soluble material comprises unmodified and modified corn, potato, wheat, rice, tapioca, waxy maize, high amylase corn starch, or combinations thereof.

16. The method of claim 10, wherein the at least a portion of the cured polymer further contacts the edge surface of the second structural member.

17. The method of claim 10, wherein the at least one opening comprises a plurality of access conduits extending through the body portion.

18. A method of forming a shaped structure, comprising:
coupling a mold comprising a body portion and a cavity surface to a substrate such that a mold cavity is defined between the cavity surface and the substrate, wherein a cross-sectional shape of the cavity corresponds to a cross-sectional shape of the shaped structure, wherein the body portion comprising a soluble material, wherein the soluble material comprises unmodified and modified wheat, tapioca, waxy maize, high amylase corn starch, or combinations thereof;
depositing an uncured curable polymer into the cavity through an opening in the mold; and
curing the uncured curable polymer to form the shaped structure,
exposing the shaped structure by dissolving a portion of the mold with a solvent and removing a portion of the mold by mechanical force.

* * * * *